United States Patent [19]
Rabe

[11] Patent Number: 5,137,675
[45] Date of Patent: Aug. 11, 1992

[54] APPARATUS AND METHOD FOR COEXTRUDING MATERIALS HAVING DIFFERENT TEMPERATURE DEPENDENT PROPERTIES

[75] Inventor: Richard L. Rabe, Cuyahoga Falls, Ohio

[73] Assignee: GenCorp Inc., Fairlawn, Ohio

[21] Appl. No.: 699,103

[22] Filed: May 13, 1991

[51] Int. Cl.⁵ .................. B29C 47/06; B29C 47/92
[52] U.S. Cl. .................... 264/171; 264/40.7; 264/177.1; 264/177.16; 425/131.1; 425/133.5; 425/462; 425/145; 425/192 R
[58] Field of Search ............... 264/171, 177.1, 177.16, 264/177.2, 40.7; 425/461–467, 381, 131.1, 133.5, 145, 192 R; 118/410–411; 156/244.11, 244.25

[56] References Cited

U.S. PATENT DOCUMENTS

| | | |
|---|---|---|
| Re. 30,789 | 11/1981 | Pilgrim et al. . |
| 2,138,378 | 11/1938 | Johnson ................. 264/171 |
| 3,046,602 | 7/1962 | Houvener ................ 425/464 |
| 3,155,540 | 11/1964 | Loeffler et al. . |
| 3,193,428 | 7/1965 | Palmer . |
| 3,706,173 | 12/1972 | Taylor . |
| 3,743,460 | 7/1973 | Woolridge ............. 425/133.5 |
| 3,836,297 | 9/1974 | Weaver . |
| 3,841,807 | 10/1974 | Weaver . |
| 3,904,470 | 9/1975 | Fukuki et al. . |
| 3,962,018 | 6/1976 | Costemalle et al. . |
| 4,076,891 | 2/1978 | Yardley et al. . |
| 4,090,906 | 5/1978 | Zoller . |
| 4,093,414 | 6/1978 | Swiatovy, Jr. . |
| 4,169,180 | 9/1979 | McDonagh . |
| 4,184,000 | 1/1980 | Denman . |
| 4,187,270 | 2/1980 | Bartrum ................. 264/177.16 |
| 4,198,983 | 4/1980 | Becker et al. . |
| 4,292,355 | 9/1981 | Bonis . |
| 4,467,061 | 8/1984 | Yamamoto et al. . |
| 4,531,326 | 7/1985 | Ballocca et al. ........... 425/465 |
| 4,537,825 | 8/1985 | Yardley . |
| 4,600,461 | 7/1986 | Guy . |
| 4,623,501 | 11/1986 | Ishizaki . |
| 4,676,856 | 6/1987 | Shigeki et al. . |
| 4,698,193 | 10/1987 | Bernitz et al. . |
| 4,701,376 | 10/1987 | Hermann et al. . |
| 4,833,194 | 5/1989 | Kuan et al. . |
| 4,856,975 | 8/1989 | Gearhart . |
| 4,883,690 | 11/1989 | Carter ................. 425/461 |
| 4,889,669 | 12/1989 | Suzuki . |
| 4,913,976 | 4/1990 | Brooks et al. . |
| 4,923,759 | 5/1990 | Brooks et al. . |
| 4,933,032 | 6/1990 | Kunert ............... 156/244.25 |
| 4,960,375 | 10/1990 | Saito et al. ............ 264/167 |
| 4,963,403 | 10/1990 | Roberts et al. ........ 156/244.11 |
| 4,965,103 | 10/1990 | Roberts et al. ........ 156/244.11 |
| 5,013,379 | 5/1991 | Brooks et al. . |

FOREIGN PATENT DOCUMENTS 0325573 1/1989 European Pat. Off. .

*Primary Examiner*—Jeffery Thurlow

[57] ABSTRACT

An apparatus and method for coextruding substrate and coating materials having different temperature dependent properties, wherein one or more predetermined amounts of the coating are metered onto one or more predetermined surfaces of the substrate. A facefed coextrusion die, including a die plate for sizing and shaping the substrate and a feed block/metering tube assembly nested in the die plate for metering the coating onto the substrate, is mounted adjacent to an outlet opening of an extruder for the substrate. The metering tube is rotatably adjustably mounted in the feed block at one of its ends, and communicates with an extruder for the coating material at its other end. The metering tube has a pair of spaced gates formed therein which are generally alignable with a pair of spaced channels formed in the feed block to enable coating material to flow through the metering tube feed block and into contact with the substrate being extruded through the die plate. The metering tube thermally isolates the coating material from the substrate material until just prior to contact therebetween to prevent premature cure of the substrate, and is manually rotatable for adjusting the position of the tube gates with respect to the feed block channels. Selective rotation of the metering tube in a clockwise or counterclockwise direction restricts the flow of coating material through one of the pairs of generally aligned metering tube gates and feed block channels while flow of the coating material through the other pair remains unrestricted.

12 Claims, 6 Drawing Sheets

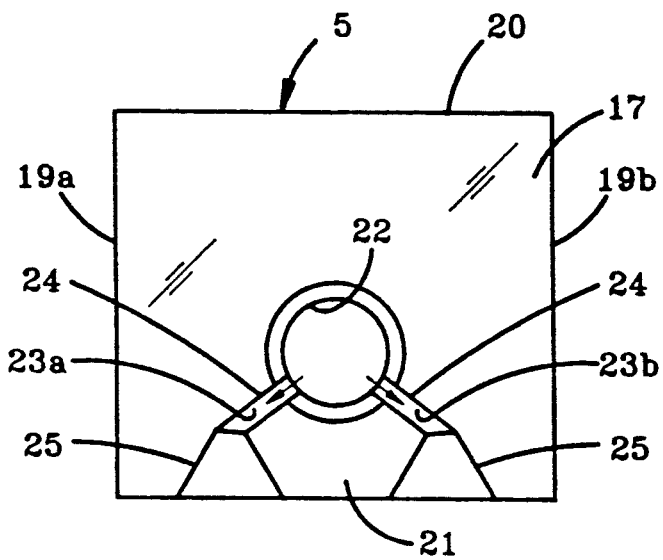
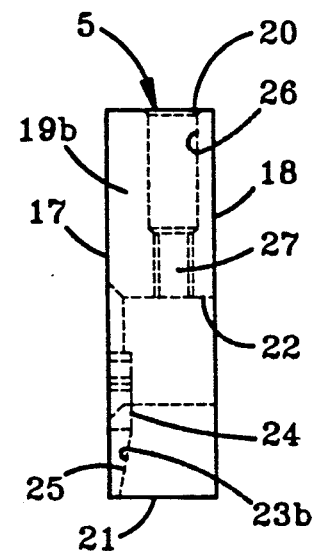
FIG-3A  FIG-3B
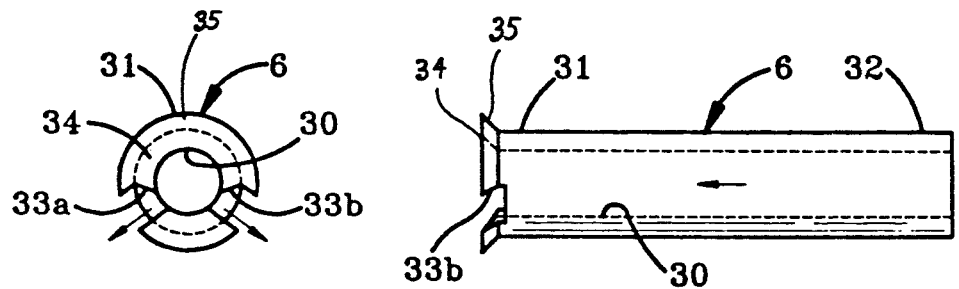
FIG-4A  FIG-4B
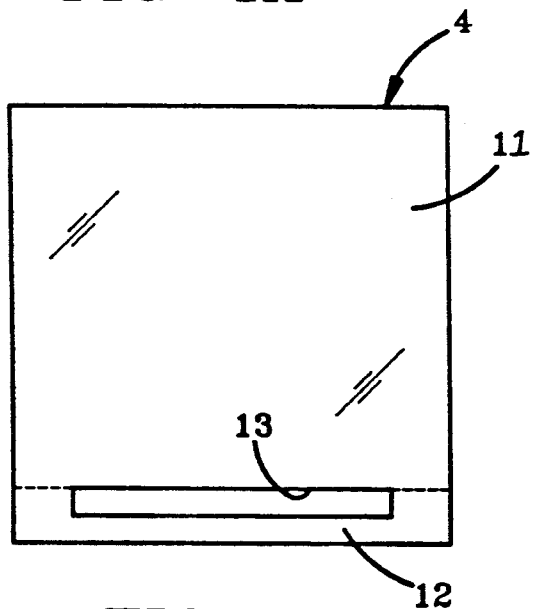
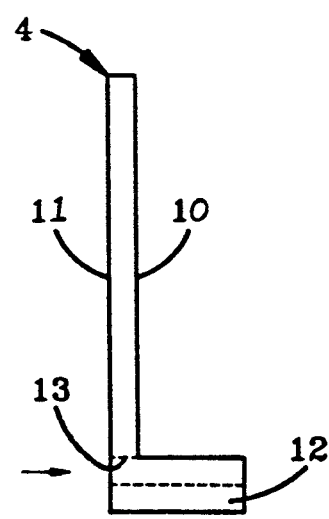
FIG-5A  FIG-5B

APPARATUS AND METHOD FOR COEXTRUDING MATERIALS HAVING DIFFERENT TEMPERATURE DEPENDENT PROPERTIES

FIELD OF THE INVENTION

The invention relates to an apparatus and method for coextruding materials having different temperature dependent properties, and in particular to an apparatus and method for temperature isolation and metering of the flow streams of such materials.

BACKGROUND ART

Coextrusion is a growing field of the extrusion art for products made with more than one material such as multilayered sheets or films. Coextrusion generally requires multiple extruders and specialized die systems to bring multiple layers together with a common sizing and shaping system. However, heretofore some material combinations have not been readily achieved in a melt combination die system due to wide differences in certain temperature dependent properties of the materials such as viscosity and degradation or die flow characteristics, so that other more time-consuming and/or expensive processes such as tandem extrusion have been utilized to form the material combination, but often with less than optimum results.

In particular, one area in which the need exists for an efficient and economical manner of combining materials having different temperature dependent properties is in the application of solventless or high solid, low-friction, abrasion-resistant polymer-based coatings to automotive weatherstrip and other product substrates for improving the performance and economic effectiveness of such products. More specifically, with regard to the differing temperature-dependent properties, selected polymer-based coatings have a processing temperature which is above the cure temperature of selected substrates, so that temperature isolation of the substrate and coating materials becomes necessary to avoid premature cure of the substrate during coextrusion of the materials. In addition, the performance and economic effectiveness of the final product is related to the thickness of the coating applied to the products, thus making the metering function of the apparatus and method of the present invention as important as the temperature isolation feature thereof which overcomes the differences in the temperature dependent properties of the coatings and product substrates.

Thus, the need exists for an apparatus and method for applying coatings to product substrates despite differences in the temperature dependent properties of the materials being combined, and further despite the need to meter one or more predetermined amounts of the coating onto one or more predetermined surfaces of the substrate.

SUMMARY OF THE INVENTION

The objects of the present invention include providing a coextrusion apparatus and method wherein materials having different temperature dependent properties may be combined to form an article of manufacture.

Another object of the present invention is to provide a coextrusion apparatus and method wherein the flow streams of the materials to be combined can be metered so that predetermined amounts of each material are extruded.

A further object of the present invention is to provide a coextrusion apparatus and method wherein solventless or high solid, low-friction, abrasion-resistant polymer-based coatings are temperature isolated from and applied to automotive weatherstrip and other product substrates having different temperature dependent properties, for improving the performance and economic effectiveness of such products.

Still another object of the present invention is to provide a coextrusion apparatus and method wherein one or more predetermined amounts of the coating material is metered onto one or more predetermined surfaces of the substrate.

A still further object of the present invention is to provide a coextrusion apparatus and method which is efficient, economical, and results in a high-performance product.

These objects are obtained by the coextrusion apparatus of the present invention, comprising, first and second extruders for coextruding first and second materials, respectively, the first and second materials having generally different temperature dependent properties, an extrusion die having a land section for forming the first material being extruded from the first extruder, a feed block positioned adjacent to the extrusion die, the feed block formed with a mounting opening, the mounting opening communicating with the land section of the extrusion die via at least one channel formed in the feed block, and a metering conduit having first and second ends, the conduit first end being adjustably mounted in the feed block mounting opening, the conduit formed with a bore communicating with the second extruder for receiving the second material, the conduit first end formed with at least one gate communicating with the bore and passing through an external surface of the conduit, the gate being selectively alignable with the feed block channel for regulating the amount of the second material passing through the aligned gate and channel from the bore and subsequently contacting the first material at the land section of the extrusion die, the metering conduit thermally isolating the second material from the first material prior to contact therebetween, so that a coextruded article is formed combining the different first and second materials.

These objects are further obtained by the method of the present invention for forming a coextruded article comprising materials having generally different temperature dependent properties, wherein the method includes the steps of, coextruding first and second materials having generally different temperature dependent properties from first and second extruders, respectively, wherein the first material is formed by an extrusion die having a land section, and wherein the second material passes through a metering conduit adjustably mounted in a mounting opening formed in a feed block, the metering conduit formed with at least one outlet gate, the gate being selectively alignable with at least one channel formed in the feed block, the channel communicating with the gate at one of its ends and opening onto the land section of the extrusion die at the other of its ends, and selectively adjusting the metering conduit in the feed block mounting opening for adjusting the relative positions of the metering conduit gate and the feed block channel, for regulating the amount of the second material passing through the aligned gate and channel from the conduit bore and subsequently contacting the first material at the land section of the extrusion die, the metering conduit temperature isolating the second material from the first material prior to contact therebetween, for forming the coextruded article.

BRIEF DESCRIPTION OF THE DRAWINGS

FIG. 3A is a front end elevational view of a feed block of the face-fed coextrusion die;

FIG. 3B is a right-hand side view of the feed block of FIG. 3A, with hidden structure shown in phantom lines;

FIG. 4A is a front end elevational view of a metering tube of the face-fed coextrusion die;

FIG. 4B is a right-hand side view of the metering tube of FIG. 4A, with hidden structure shown in phantom lines;

FIG. 5A is a front end elevational view of a die plate of the face-fed coextrusion die;

FIG. 5B is a left-hand side view of the die plate of FIG. 5A, with hidden structure shown in phantom lines;

Similar numerals refer to similar parts throughout the drawings.

DESCRIPTION OF THE INVENTION

Figure 1:
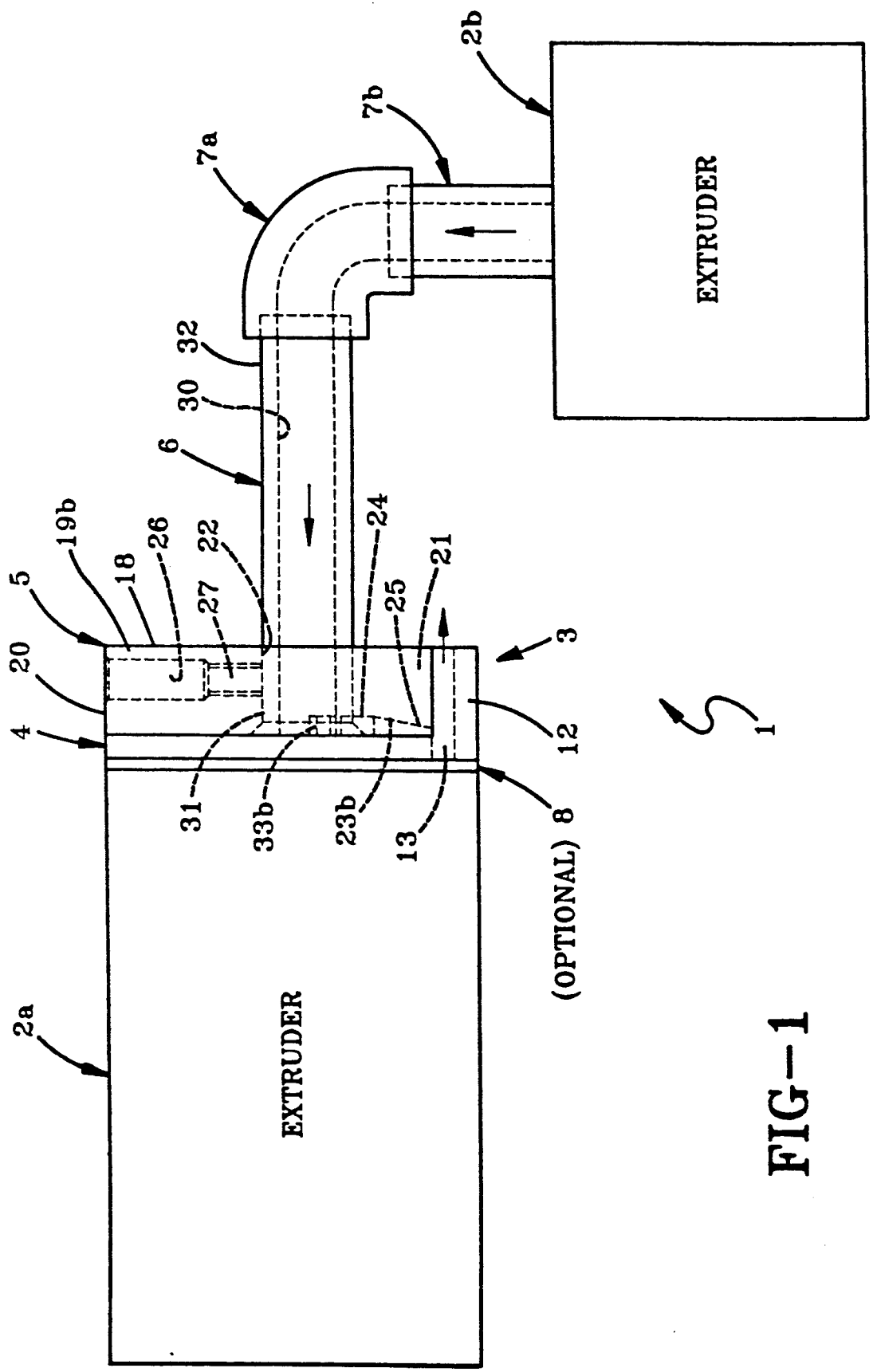
FIG. 1 is a schematic view of a prototype of the coextrusion apparatus of the present invention, with hidden structure shown in phantom lines and arrows indicating the direction of flow of materials through the apparatus.

A prototype of the apparatus of the present invention for coextruding materials having different temperature dependent properties is indicated generally at 1 and is shown in FIG. 1. Apparatus 1 is intended for use in the application of solventless, polymer-based thermoplastic or thermoset plastic coatings to elastomeric automotive glass run channel substrates for producing a high-performance, economically effective product having selected low-friction and abrasion-resistant surfaces of certain thicknesses. More particularly, apparatus 1 isolates the substrate and coating materials to prevent premature cure of the substrate due to the processing temperature of the coating which is higher than the cure temperature of the substrate. However, it is to be understood that apparatus 1 is contemplated for use in other applications wherein it is desirable to coextrude materials having different temperature dependent properties by temperature isolation and metering of the flow streams of such materials.

Apparatus 1 includes first and second extruders $2a$ and $2b$, respectively, a face-fed coextrusion die indicated generally at 3 which comprises a die plate 4, a feed block 5 and a metering tube 6, connecting conduits $7a$ and $7b$, and an optional insulation plate 8. Extruders $2a$ and $2b$ may be any suitable extruders as are well-known to the art and to the literature, with the choice thereof depending upon the materials to be processed.

Figure 2:
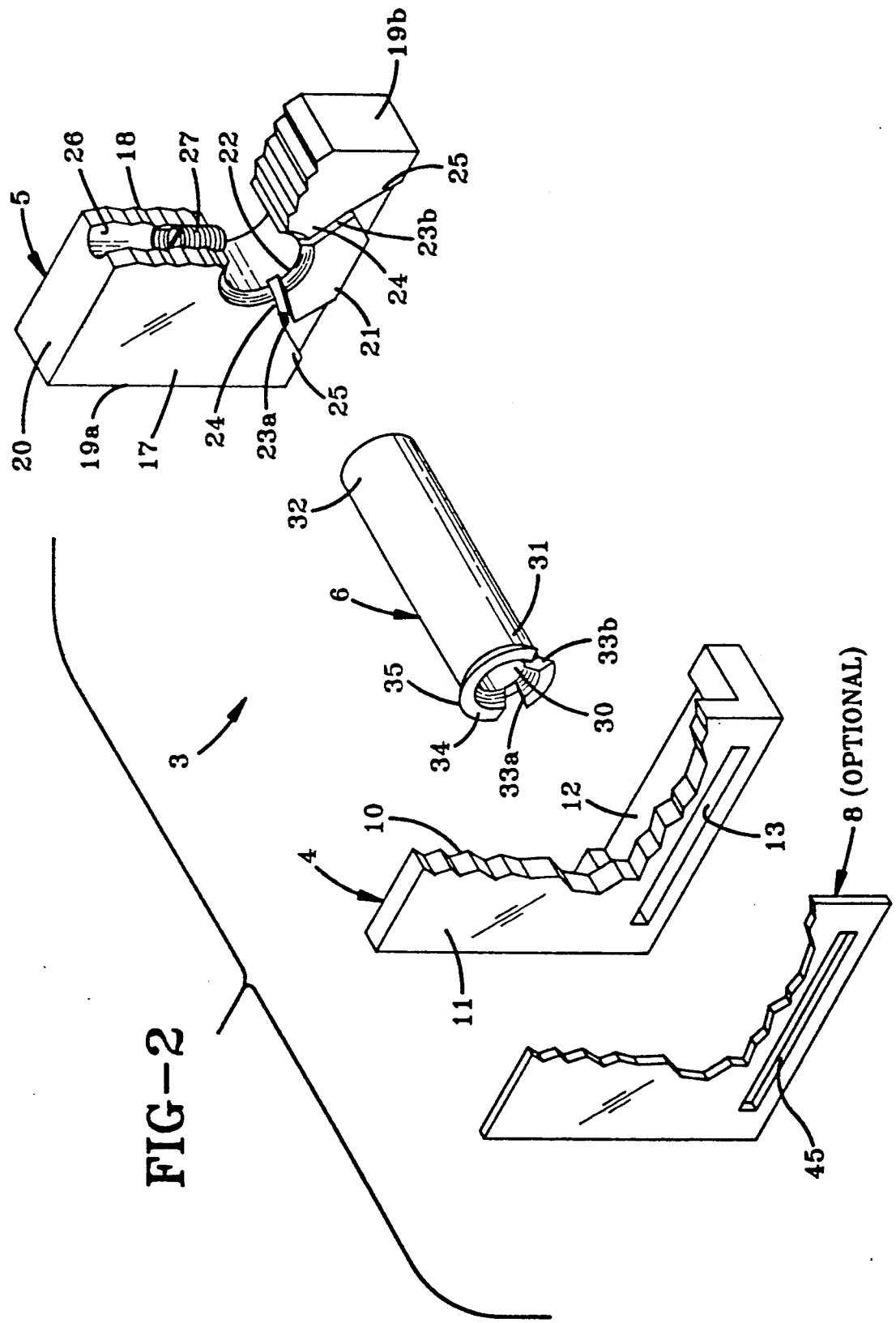
FIG. 2 is an exploded perspective view, with portions broken away, of a face-fed coextrusion die of the apparatus.

Die plate 4 of face-fed coextrusion die 3, as best shown in FIGS. 2, 5A and 5B, is generally flat and includes front and rear surfaces 10 and 11, respectively, and a land section 12 which extends outwardly from front surface 10. Die plate 4 is formed with an opening 13 which passes through front and rear surfaces 10 and 11 for defining the desired shape and size of an extruded substrate.

Feed block 5, as best shown in FIGS. 2, 3A and 3B, is generally flat and includes front and rear surfaces 17 and 18, respectively, side surfaces $19a$ and $19b$, a top surface 20, and a bottom or land section 21. A generally circular-shaped mounting opening 22 is formed in feed block 5 and passes through front and rear surfaces 17 and 18. Mounting opening 22 has a flared portion 46 adjacent to front surface 17 of feed block 5, for matingly engaging metering tube 6 as described in detail below. A pair of spaced, generally downwardly-sidewardly extending channels $23a$ and $23b$ are formed in front surface 17 of feed block 5. Each channel 23 communicates with mounting opening 22, and land section 21 of feed block 5, and is similar to the other channel. Each channel 23 includes upper and lower portions 24 and 25, respectively. Upper channel portion 24 has a constant depth and width which is less than the diameter of mounting opening 22 and lower channel portion 25 fans out or continuously increases in width from the width of upper portion 24 and narrows or continuously decreases in depth from the depth of upper portion 24, in a downward direction. An opening 26 is formed in feed block 5 and passes through top surface 20 of the feed block and communicates with mounting opening 22. Opening 26 is threaded for receiving and threadably engaging a set screw 27 adapted to engage metering tube 6, as outlined in detail below in the description of the assembly and operation of coextrusion apparatus 1 of the present invention.

Figures 6A, 6B:
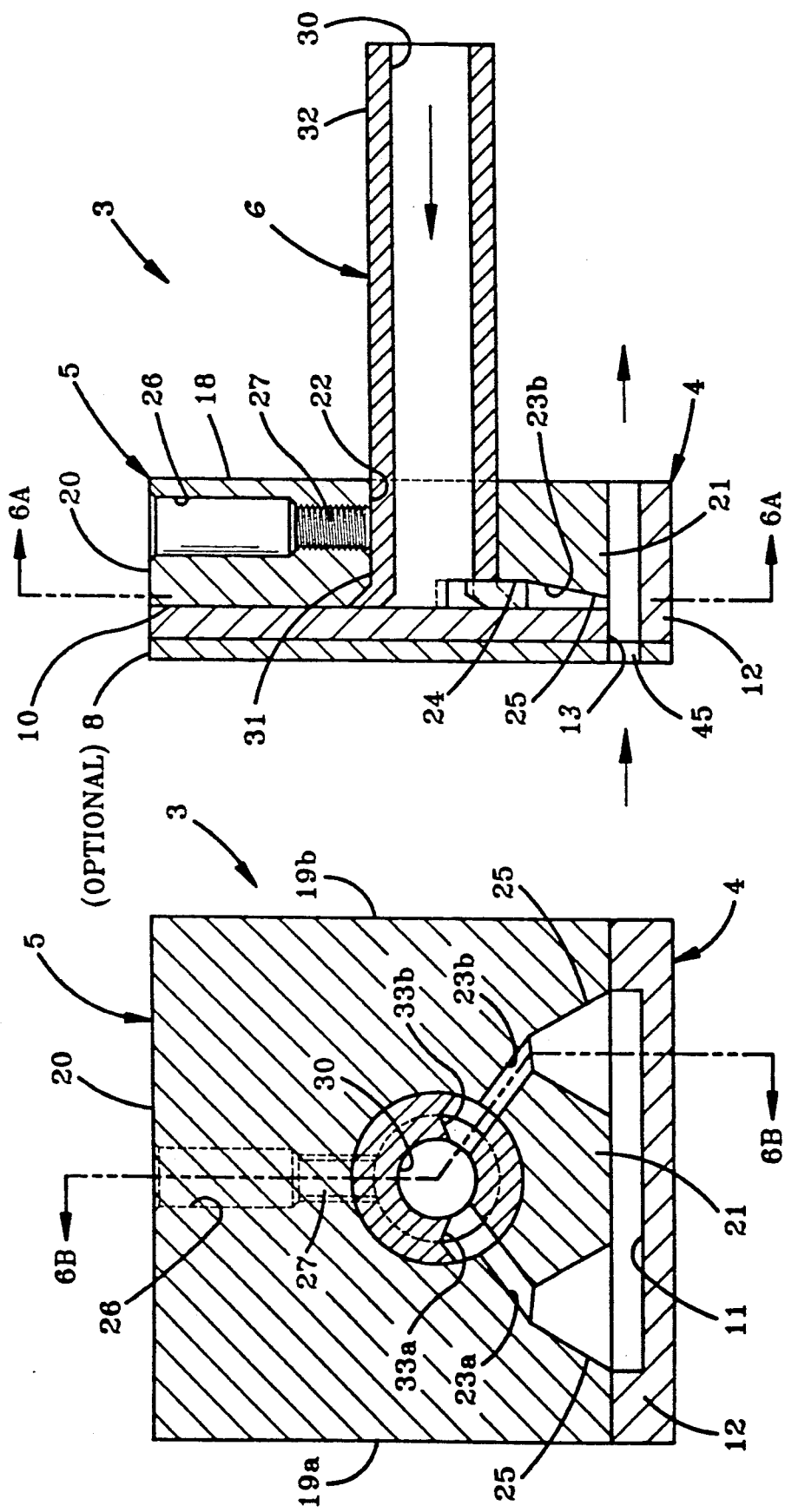
FIG. 6A is a sectional view taken on line 6A—6A of FIG. 6B, with hidden structure shown in phantom lines, of the assembled face-fed coextrusion die of the apparatus of the present invention.
FIG. 6B is a sectional view taken on line 6B—6B of FIG. 6A, with hidden structure shown in phantom lines.

Metering tube 6, as best shown in FIGS. 2, 4A and 4B, is a generally circular-shaped tube having an outside diameter which is less than, but within from about 0.001 to about 0.002 inches of, the diameter of mounting opening 22 of feed block 5 for ensuring a close tolerance, friction fit of the metering tube within the mounting opening. Metering tube 6 is formed with a central bore 30 which passes through first and second ends 31 and 32, respectively, of the tube. First end 31 of metering tube 6 is formed with a flared flange 35 adapted to matingly engage flared portion 46 of mounting opening 22. A pair of spaced, radially extending outlet gates 33a and 33b of equal depth are formed in a flat end face 34 of first end 31 of metering tube 6. The depth of gates 33 is equal to the depth of upper channel portions 24 of feed block 5. As best shown in FIG. 6A, each metering tube gate 33a and 33b has a width generally equal to the width of upper channel portions 24 at the inside diameter of metering tube 6, with such width continuously increasing to approximately twice such inside diameter width at the outside diameter of the tube. This fan-shaped structure of metering gates 33 provides unique metering capabilities to metering tube 6 when used in combination with the above-described feed block 5 of the present invention, which metering function will be described below in the description of the operation of face-fed coextrusion die of apparatus 1.

Coextrusion apparatus 1 of the present invention is assembled in the following manner, and is best shown in the assembled state in FIG. 1. Face-fed coextrusion die 3 of apparatus 1, the components of which are shown in FIG. 2 in a preassembled state and in FIGS. 6A and 6B in an assembled state, is assembled first as follows. Second end 32 of metering tube 6 is passed through mounting opening 22 of feed block 5 in the direction of front surface 17 to rear surface 18, until flared flange 35 of metering tube first end 31 matingly engages flared portion 46 of the mounting opening. When metering tube 6 is fully slidably frictionally mounted in mounting opening 22, flat end face 34 of the tube is generally flush with front surface 17 of feed block 5. Feed block 5 then is mounted on die plate 4 by nesting of land section 21 of the feed block in land section 12 of the die plate. More particularly, front surface 17 of feed block 5 abuts front surface 10 of die plate 4.

In accordance with one of the main features of the present invention, the independent structures of feed block 5 and metering tube 6 create the necessary temperature isolation of the material from extruder 2b passing through the metering tube, from the material being extruded from extruder 2a. The close friction fit of metering tube 6 in mounting opening 22 of feed block 5 necessitates manual adjustment of the metering tube, when the same is required as will be discussed below in the description of the operation of coextrusion apparatus 1, by a tool such as a channel lock or the like for rotatably adjusting the tube. Subsequent to adjustment of metering tube 6 to a selected rotational position, the tube is locked in place by manually tightening set screw 27. Thus, it is clear that when a material is moving through bore 30 of metering tube 6 in the direction of the arrows of FIGS. 1 and 6B, the material must exit face-fed coextrusion die 3 through gates 33 of the tube and channels 23 of feed block 5 at land sections 12 and 21 of die plate 4 and feed block 5, respectively. More particularly, abutting front surface 10 of die plate 4 acts as a backstop against material flowing into gates 33 and channels 23 from bore 30.

Assembled face-fed coextrusion die 3 then is mounted adjacent to an outlet opening (not shown) of extruder 2a, with rear surface 11 of die plate 4 facing the extruder (FIG. 1). Conduits 7a and 7b extend between and are attached to end 32 of metering tube 6 and an outlet opening (also not shown) of extruder 2b to provide communication between bore 30 of the metering tube and the outlet opening of extruder 2b.

Optional insulation plate 8 may be interposed between die plate 4 and the outlet opening of extruder 2a as illustrated in FIGS. 1, 2 and 6B, or less preferably between the die plate and feed block 5, to further aid in the temperature isolation of the material being conveyed through metering tube 6 from the material contained in extruder 2a having different temperature dependent properties.

Figure 7A:
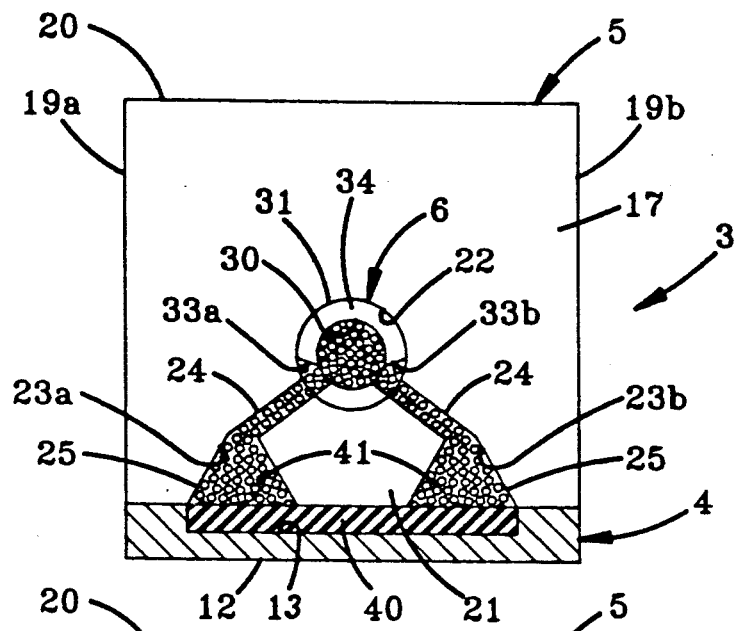
FIG. 7A is a sectional view of the face-fed coextrusion die, showing a coating being applied to an extruded rubber substrate wherein the amount of coating material passing through the metering tube gates and feed block channels is unrestricted.
Figure 7B:
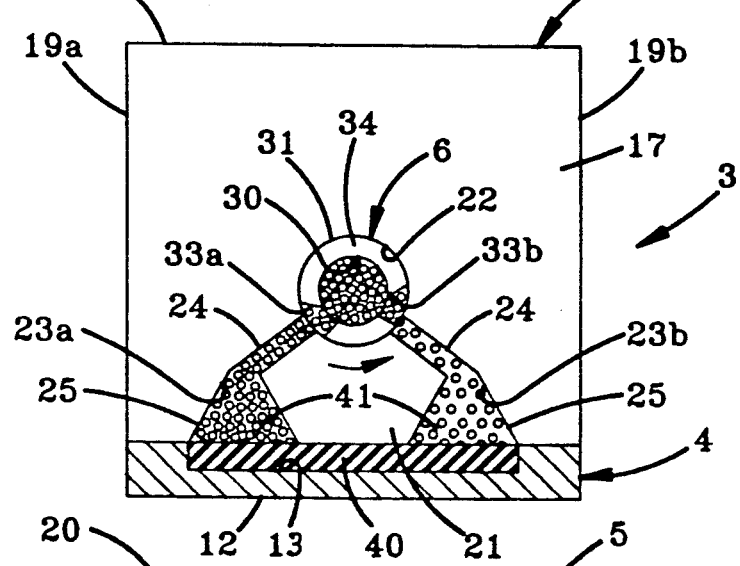
FIG. 7B is a view similar to FIG. 7A, showing the position of the metering tube subsequent to selective rotation thereof in a counterclockwise direction of the arrow, for restricting the amount of coating material passing through the right-hand metering tube gate and feed block channel.
Figure 7C:
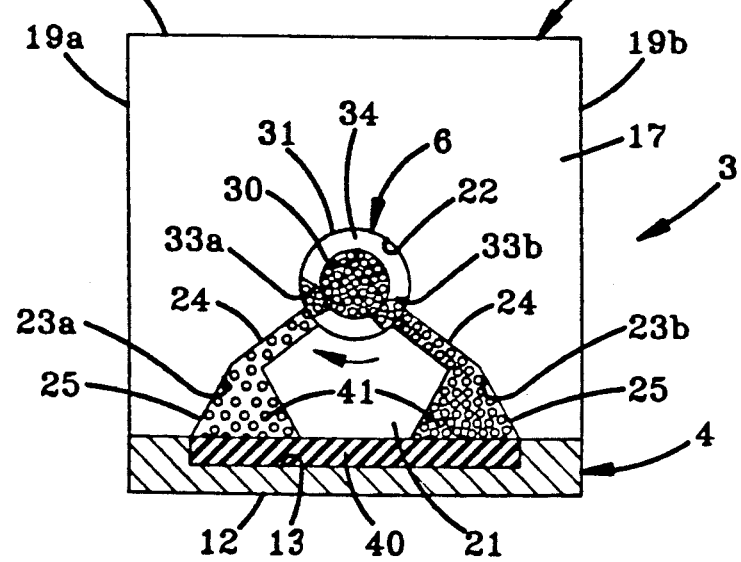
FIG. 7C is a view similar to FIGS. 7A and 7B, showing the position of the metering tube subsequent to selective rotation thereof in a clockwise direction of the arrow from the position shown in FIG. 7A, for restricting the amount of coating material passing through the left-hand metering tube gate and feed block channel.

The method of forming a coextruded article of manufacture comprising two materials having different temperature dependent properties utilizing apparatus 1 of the present invention, is carried out in the following manner. Extruder 2a is charged with a predetermined substrate material 40. Substrate 40 desirably is formed of any commercially available flexible elastomer of the type which are well known to the art and to the literature, with preferred elastomers including butadiene-based rubbers of styrene-butadiene rubber and nitrile rubber or acrylonitrile-butadiene rubber, and natural rubber or synthetic isoprene rubber. A highly preferred elastomer is ethylene-propylene terpolymer, also commonly referred to as EPDM, which flows at a temperature of from about 80° C. about 100° C. Extruder 2b is generally simultaneously charged with a predetermined coating material 41. The coating desirably is a polyolefin, with preferred polyolefins for use in the present invention including polypropylene, polyethylene, and ethylene-propylene copolymers, which flow at from about 200° C. to about 250° C. Since EPDM rubber cures at about 165° C., it can be seen that if the coating and substrate materials are not temperature isolated, then the high processing temperature of the coating material would cause premature cure of the elastomeric substrate thereby preventing good adhesion between the coating and substrate materials and/or plugging of die plate opening 13, which is undesirable. As extruders 2a and 2b extrude their respective materials through the outlet openings of the extruders, elastomeric substrate 40 is sized and shaped as it passes through land section 12 of die plate 4, and more particularly through opening 13 thereof as best shown in FIGS. 7A through 7C. Simultaneously with the extrusion of elastomeric substrate 40 through die plate 4 of face-fed coextrusion die 3, the solventless polyolefin coating 41 is extruded out of feed block 5 at land section 21 thereof via metering tube bore 30, metering tube gates 33, and feed block channels 23, and contacts predetermined surfaces of the substrate to form a low-friction, abrasion-resistant coating on those surfaces of the substrate.

In accordance with another of the important features of the present invention, since the performance and economic effectiveness of such coated products is related to the thickness of the polyolefin coating applied thereto, it is critical that the proper amount of coating material be allowed to flow through metering tube gates 33 and feed block channels 23. It should be noted that for a given volumetric flow rate of substrate material through coextrusion die 3, the coating thickness thereon will be determined by the coating material flow rate. In prior art apparatus, coating flow rates typically are controlled either by adjusting the extruder speed, or by adjusting a choker mechanism which is built into the die and which mechanisms are well known to the art and to the literature. However, for products such as are contemplated for manufacture using the present invention and which require application of a coating of the same material on two or more separate surfaces of the substrate, adjustment of the extruder speed to meter the coating flow is impractical, especially if the surfaces of the substrate to be coated are of unequal width. Choker mechanisms are not practical to incorporate into every extrusion die design, especially where relatively thin die plates such as is being utilized in the present invention are used, since such thin die plates typically are mounted in a recess in a large jacketed head of the extruder where the die plate becomes inaccessible to an operator during production. Moreover, it would be impractical to coextrude materials having different temperature dependent properties of the type being utilized in the present invention in conventional coextrusion dies, and still achieve the required temperature isolation. Therefore, the coextrusion apparatus of the present invention, and in particular face-fed coextrusion die 3, is utilized to enable metering of the flow streams of the materials being combined, so that one or more predetermined amounts of the coating material may be applied to one or more predetermined surfaces of the substrate material, while achieving temperature isolation of the materials until just prior to contact of the coating material with the substrate material.

More particularly, metering tube 6 is manually rotated to various positions such as shown in FIGS. 7A through 7C to achieve dispensing of the proper predetermined amount of coating material on the predetermined substrate surfaces to be coated. For example, and as shown in FIG. 7A, if it is desired that equal amounts of the coating material be dispensed on the two surfaces of equal width of the substrate to be coated, then metering tube 6 is rotated to a position as shown in FIG. 7A so that both metering tube gates 33a and 33b are generally aligned with the upper portion 24 of feed block channels 23a and 23b, respectively, so that the amount of coating material flowing through the metering tube gates and feed block channels is unrestricted. If it is desired to coat the left-hand surface of the substrate with a greater amount of the coating material than the righthand surface, then metering tube 6 is selectively rotated in a counterclockwise direction as shown by the arrow in FIG. 7B to generally restrict the flow of coating material through metering tube gate 33b and feed block channel 23b while maintaining unrestricted flow of the material through gate 33a and channel 23a. This restricted flow is accomplished by decreasing the width of the opening at the interface of gate 33b and upper portion 24 of channel 23b. Conversely, if it is desirable to restrict the flow of coating material out of gate 33a and channel 23a, then tube 6 is selectively rotated in a clockwise direction as shown by the arrow in FIG. 7C. Once the desired flow of coating material through gates 33 and channels 23 has been achieved, set screw 27 is tightened against metering tube 6 to secure the metering tube in the selected rotational position. It is understood that the concepts described herein include the use of multiple metering tubes or concentric metering tubes to meter flow to more than two flow channels or to meter flow of more than one coating material. It is further understood that the temperature and pressure of each extruder 2a and 2b can be varied depending on the material being processed therein.

It should also be noted that the design of metering tube 6 and feed block 5 results in a smooth coating on the substrate having good multidirectional strength. More specifically, the phenomenon of biaxial stretching is observed in the flow streams of the coating material.

That is, as the polymer-based coating material is flowing through bore 30 of the metering tube, the polymeric chains are in a generally disordered state. As the coating material flows through gates 33 of the metering tube and the upper portion 24 of channels 23 of the feed block which are narrower in width than the diameter of bore 30, the polymer chains are caused to become elongated. Finally, as the coating material flows into the increasingly wide lower portion 25 of channels 23, the elongated polymer chains become orderly, thus resulting in the above-described smooth and strong coating on the substrate material.

After application and adherence of the polyolefin coating to the elastomeric substrate, the coextruded product then can be passed through a curing oven for curing the substrate, after which the entire product is cooled, which curing and cooling steps are well known to those skilled in the art.

Figure 8:
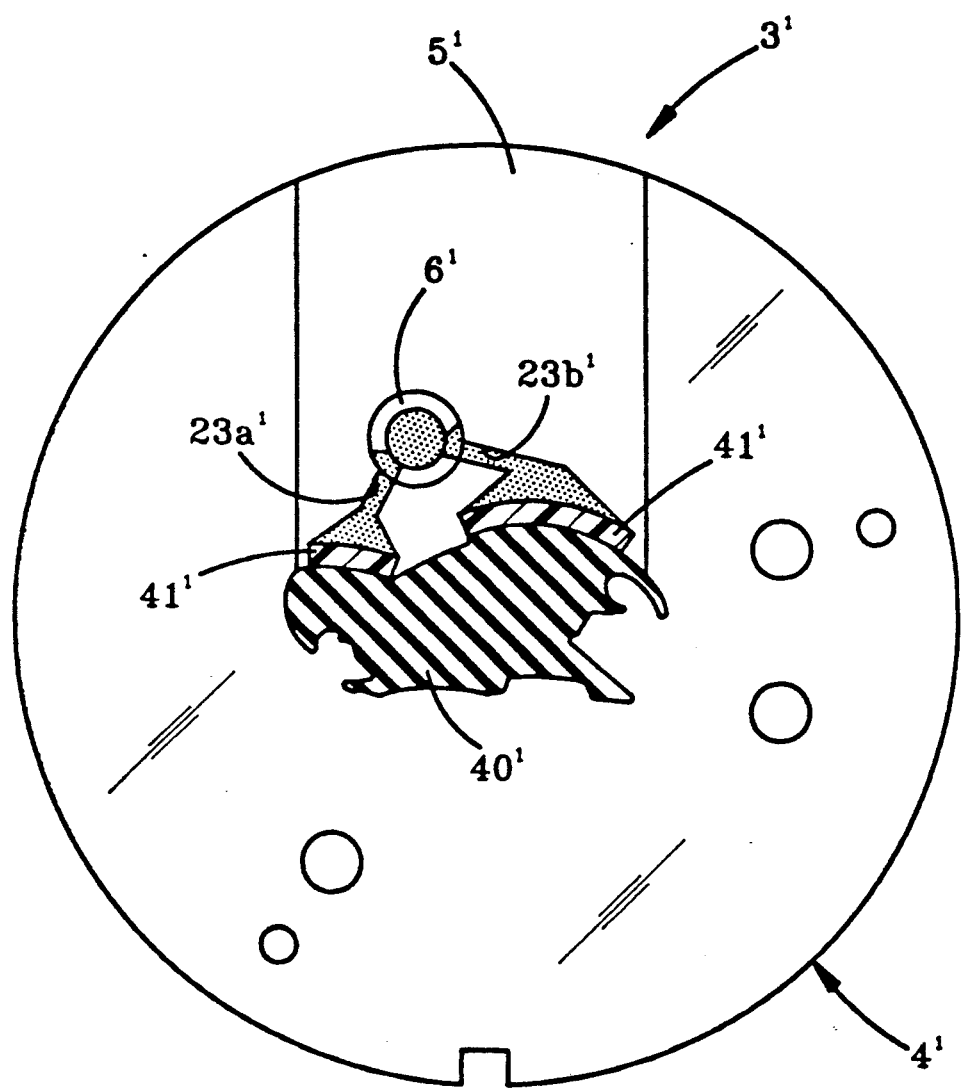
FIG. 8 is a view similar to FIG. 7A of a customized face-fed coextrusion die, showing a solventless polymer-based plastic coating being applied in different widths and amounts to different portions of an extruded elastomeric automotive glass run channel substrate, for producing an automotive glass run channel having selected low-friction abrasion-resistant surfaces.

A customized face-fed coextrusion die, indicated generally at 3', for use in coextrusion apparatus 1 of the present invention is shown in FIG. 8. Face-fed coextrusion die 3' is similar to prototypical face-fed coextrusion die 3 described above for coextrusion apparatus 1, except that the coextrusion die has been customized for use in applying a solventless low-friction, abrasion-resistant polymer-based polyolefin coating 41' to an elastomeric automotive glass run channel substrate 40'. Customized coextrusion die 3' includes die plate 4', feed block 5', and metering tube 6'. It should be noted that feed block channels 23a' and 23b' of feed block 5' have been customized so that predetermined unequal widths and amounts of coating 41' can be applied to the predetermined two distinct surfaces of substrate 40' to be coated.

Again, it can be seen that the coextrusion apparatus and method of the present invention can be generally utilized for coextruding materials having different temperature dependent properties, and in particular for temperature isolation and metering of the flow steams of such materials. More particularly, apparatus 1 can be utilized in the application of solventless or high solid, low-friction, abrasion-resistant polymer-based polyolefin coatings to elastomeric automotive weather-strip and other products for improving the performance and economic effectiveness of such products. It is to be noted that the performance and economic effectiveness of the product is related to the thickness of the coating applied thereto, thus making the metering function of the apparatus as important as the temperature isolation feature thereof. Such coatings can be applied to substrates using the apparatus of the present invention despite differences in the temperature dependent properties of the materials being combined, and further, despite the need to meter one or predetermined amounts of the coating onto one or more predetermined surfaces of the substrate.

While in accordance with the Patent Statutes, the best mode and preferred embodiment having been set forth, the scope of the invention is not limited thereto, but rather by the scope of the attached claims.

What is claimed is:

1. A coextrusion apparatus, comprising:
    at least first and second extruders for coextruding first and second materials, respectively, said first and second materials having generally different temperature dependent properties;

an extrusion die plate having a land section for forming said first material being extruded from said first extruder;

a feed block positioned adjacent to said extrusion die plate, said feed block formed with a mounting opening, said mounting opening communicating with said land section of said extrusion die plate via at least one channel formed in said feed block; and a metering conduit having first and second ends, said conduit first end being adjustably mounted in said feed block mounting opening, said conduit formed with a bore communicating with said second extruder for receiving said second material, said conduit first end formed with at least one gate communicating with said bore and passing through an external surface of said conduit, said gate being selectively alignable with said feed block channel for regulating the amount of said second material passing through said aligned gate and channel from said bore and subsequently contacting said first material at said land section of said extrusion die plate, said metering conduit thermally isolating said second material from said first material prior to contact therebetween, so that a coextruded article is formed combining said different first and second materials.

2. The apparatus of claim 1, wherein said extrusion die plate is a profile die; and wherein said first material is a substrate and said second material is a coating.

3. The apparatus of claim 2, wherein said feed block mounting opening is generally circular-shaped; wherein said metering conduit is a tube rotatably adjustably mounted in said mounting opening and having an outside diameter of from about 0.001 to about 0.002 inches less than the diameter of said mounting opening; wherein said feed block is a generally flat member having front and rear surfaces, a pair of side surfaces, a top surface, and a land section; wherein a threaded adjustment opening is formed in said feed block and passes through said top surface and communicates with said mounting opening; and wherein a set screw is threadably engaged in said adjustment opening for locking said metering tube in a selected rotational position.

4. The apparatus of claim 3, wherein said mounting opening passes through said front and rear surfaces and includes a flared portion adjacent to said front surface; wherein said feed block is formed with a pair of spaced channels in said feed block front surface and said front surface abuts said extrusion die plate; wherein said metering tube first end is formed with a flared flange and is open, and has a pair of spaced, radially oriented gates formed in a flat end face of said first end; wherein said metering tube flared flange matingly engages said mounting opening flared portion and said flat end face is generally flush with said feed block front surface and abuts said extrusion die plate; wherein said pair of gates is selectively alignable with said pair of feed block channels; wherein each of said feed block channels includes an upper portion and a lower portion; wherein said upper channel portion has a constant depth and a width less than the diameter of said feed block mounting opening; wherein said lower channel portion continuously increases in width from the width of said upper channel portion and narrows or continuously decreases in depth from the depth of said upper portion in a direction away from said upper channel portion; wherein said metering tube gates each have a depth generally equal to the depth of said upper channel portion of each of said feed block channels; wherein said metering tube gates each have a width at the inside diameter of said tube generally equal to the width of said upper channel portion of each of said feed block channels, and a width at the outside diameter of said metering tube generally twice that of said inside diameter width.

5. The apparatus of claim 4, wherein said metering tube and set screw each is manually adjustable; wherein an optional insulation plate is positioned against said extrusion die plate on a surface of said die opposite from a surface of said die plate abutting said feed block.

6. The apparatus of claim 5, wherein said substrate material is a flexible elastomer; wherein said coating material is a solvent-free, polyolefin compound; and wherein said temperature dependent properties of said flexible elastomer and said polyolefin compound are cure temperature and processing temperature, respectively.

7. The apparatus of claim 6, wherein said flexible elastomer substrate is an automotive glass run channel; and wherein said polyolefin compound is applied to one or more predetermined surfaces of said channel in one or more predetermined amounts to form low-friction, abrasion-resistant surfaces on said channel.

8. A method of forming a coextruded article comprising materials having generally different temperature dependent properties, said method including the steps of:

coextruding at least first and second materials having generally different temperature dependent properties from at least first and second extruders, respectively, wherein said first material is formed by an extrusion die plate having a land section, and wherein said second material passes through a metering conduit adjustably mounted in a mounting opening formed in a feed block, said metering conduit formed with at least one outlet gate, said gate being selectively alignable with at least one channel formed in said feed block, said channel communicating with said gate at one of its ends and opening onto said land section of said extrusion die plate at the other of its ends; and selectively adjusting said metering conduit in said feed block mounting opening for adjusting the relative positions of said metering conduit gate and said feed block channel, for regulating the amount of said second material passing through said aligned gate and channel from said conduit bore and subsequently contacting said first material at said land section of said extrusion die plate, said metering conduit temperature isolating said second material from said first material prior to contact therebetween, for forming said coextruded article.

9. The method of claim 8, wherein said feed block mounting opening is generally circular-shaped and said metering conduit is tubular-shaped for manually rotatably adjusting said conduit in said opening; and manually locking said metering conduit in a selected rotational position.

10. The method of claim 9, including the step of selectively aligning a pair of outlet gates with a pair of feed block channels.

11. The method of claim 10, including the step of applying said second material in one or more predetermined amounts to one or more predetermined surfaces of said first material.

12. A coextrusion apparatus, comprising:

at least first and second extruders for coextruding first and second materials, respectively, said first and second materials having generally different temperature dependent properties;

a profile die having a land section for forming said first material being extruded from said first extruder;

a feed back formed with a generally circular-shaped mounting opening, said feed block being a generally flat member having front and rear surfaces, a pair of side surfaces, a top surface, and a land section, said mounting opening passing through said front and rear surfaces and including a flared portion adjacent to said front surface, said feed block being formed with a threaded adjustment opening passing through said top surface and communicating with said mounting opening, said threaded adjustment opening threadably engaging a manually adjustable set screw, said feed block further being formed with a pair of spaced channels in said feed block front surface, said front surface abutting said profile die, said mounting opening communicating with said land section of said profile die via said feed block channels, each of said feed block channels including an upper portion and a lower portion, said upper channel portion having a width less than the diameter of said feed block mounting opening and said lower channel portion continuously increasing in width from the width of said upper channel portion in a direction away from said upper channel portion; and a metering tube formed with open first and second ends and a continuous bore, said metering tube first end being formed with a flared flange and further being manually rotatably adjustably mounted in said mounting opening, said metering tube open second end communicating with said second extruder for receiving said second material, said metering tube first end flange having a flat end face formed with a pair of spaced, radially oriented gates, said metering tube flared flange matingly engaging said mounting opening flared portion and said flat end face being generally flush with said feed block front surface and abutting said profile said metering tube gates communicating with said continuous bore and passing through an external surface of said tube, said metering tube gates each having a width at the inside diameter of said tube generally equal to the width of said upper channel portion of each of said feed block channels, and a width at the outside diameter of said metering tube generally twice that of said inside diameter width, said pair of gates being selectively alignable with said pair of feed block channels for regulating the amount of said second material passing through said aligned gates and channels from said bore and subsequently contacting said first material at said land section of said profile die, said set screw being capable of locking said metering tube in a selected rotational position, said metering tube thermally isolating said second material from said first material prior to contact therebetween, so that a coextruded article is formed combining said different first and second materials.

* * * * *